March 19, 1963  F. W. BROOKS ETAL  3,081,744
BRAKE BOOSTER CONTROL VALVE MECHANISM
Filed Aug. 7, 1961  2 Sheets-Sheet 1

INVENTORS
FRANK W. BROOKS
JAMES O. HELVERN
BY D. C. Staley
THEIR ATTORNEY

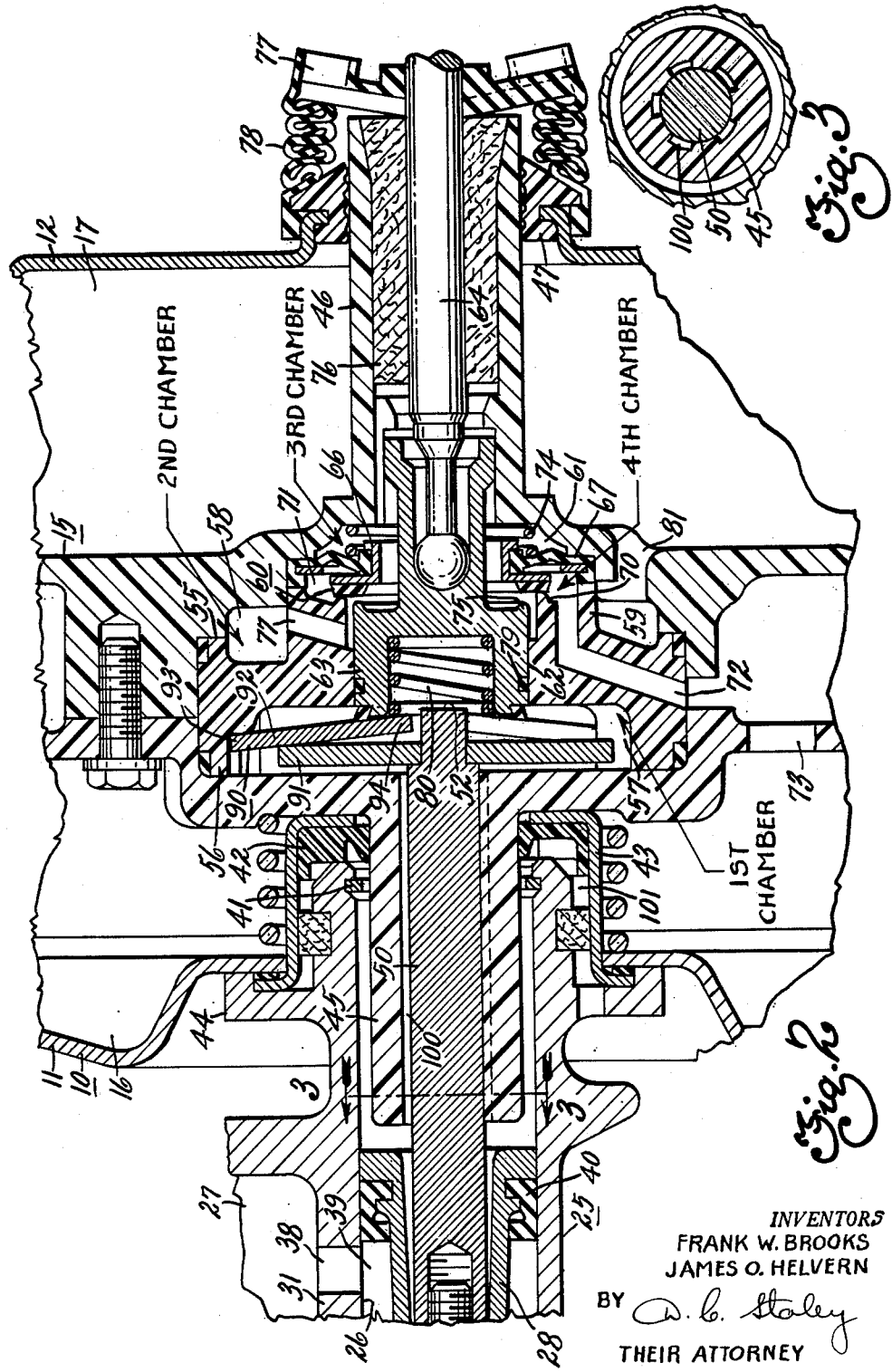

United States Patent Office 3,081,744
Patented Mar. 19, 1963

3,081,744
BRAKE BOOSTER CONTROL VALVE MECHANISM
Frank W. Brooks, Dayton, and James O. Helvern, Lewisburg, Ohio, assignors to General Motors Corporation, Detroit, Mich., a corporation of Delaware
Filed Aug. 7, 1961, Ser. No. 129,806
2 Claims. (Cl. 121—41)

This invention relates to brake boosters for power actuation of the brakes of a motor vehicle.

An object of the invention is to provide a simplified follow-up control valve mechanism for regulating fluid pressure to opposite sides of the movable power wall of a brake booster.

Further objects and advantages of the present invention will be apparent from the following description, reference being had to the accompanying drawings wherein preferred embodiments of the present invention are clearly shown.

In the drawings:

FIGURE 2 is a longitudinal cross-sectional view somewhat enlarged and similar to FIGURE 1 of a portion of the control mechanism illustrating the brake booster in a power applied position.

FIGURE 3 is a transverse cross-sectional view taken along line 3—3 of FIGURE 2.

Figure 1:
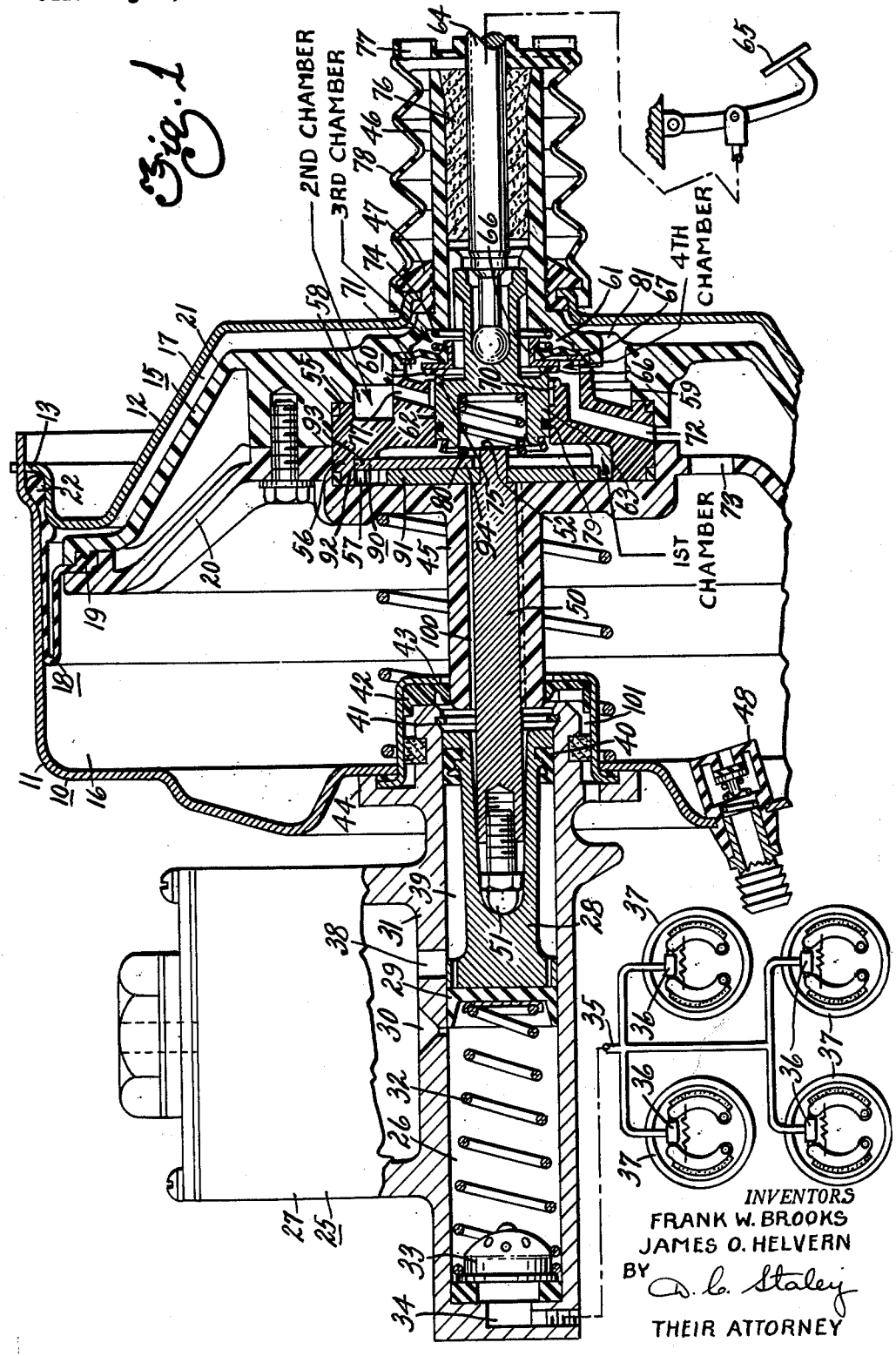
FIGURE 1 is a longitudinal cross-sectional view of a power brake booster incorporating features of this invention illustrating the booster in retracted or inactive position.

The power brake booster of this invention includes a casing 10 comprising two shell members 11 and 12 secured together by a bayonet lock arrangement 13. The casing 10 includes a pressure differential responsive movable wall 15 that divides the casing into two compartments 16 and 17 at opposite sides of the movable wall 15, the movable wall including a rolling diaphragm 18 having its inner peripheral edge 19 secured between the wall members 20 and 21 of the movable wall and having its outer peripheral edge 22 secured between the shells 11 and 12.

The shell 11 supports a master cylinder 25 having a master cylinder bore 26, a reservoir 27 being integral with the master cylinder 25. A master cylinder piston 28 is reciprocable in the cylinder bore 26 and has a cup seal 29 at the forward end thereof positioned just rearwardly of the fill port 30 provided in the bottom wall 31 of the reservoir for filling the cylinder bore 26 when the piston 28 is in the retracted position shown in FIGURE 1. A compression spring 32 extends between the piston 28 and a residual pressure check valve 33 which controls fluid flow to and from the outlet passage 34 which in turn is connected by a conduit 35 with the wheel cylinders 36 of the brakes 37 of the motor vehicle. The reservoir bottom wall 31 also has a port 38 adapted for communication with the annular chamber 39 provided between opposite ends of the piston 28 to prevent cavitation in the cylinder bore 26 on a fast return stroke of the piston.

The piston 28 has a seal member 40 at the rear end thereof and the piston is adapted to engage a stop ring 41 when in the retracted position. A seal member 42 is carried in a cap 43 that is secured to the shell 11 by the flange portion 44 of the master cylinder 35, the seal member 42 supporting the forward extending wall portion 45 of the movable wall 15.

The movable wall 15 also has a rearward cylindrical projection 46 supported by a seal member 47, thereby closing the chambers 16 and 17 against atmosphere, chamber 16 being connected with a suitable source of vacuum, or subatmospheric pressure, through a check valve 48, such as the manifold of the engine of the vehicle. A power plunger 50 has its forward end 51 engaging the master cylinder piston 28 and its rearward end 52 connected with the movable wall 15 in a manner hereinafter described.

The wall members 20 and 21 of the movable wall 15 each has an axial annular recess that cooperates to form a compartment 55 which receives a carrier member 56 so that the carrier member 56 and the movable wall 15 support and carry a follow-up control valve mechanism 60 that has one position illustrated in FIGURE 1 wherein equivalent subatmospheric pressure is present in chambers 16 and 17 so that the movable wall 15 remains inactive and a second position, shown in FIGURE 2, wherein there is a pressure differential between the chambers 16 and 17, pressure being increased in chamber 17 by admission of atmospheric air thereto, by which the movable wall 15 is activated to place the power unit on a power stroke and effect thereby operation of the brakes of the vehicle.

The carrier member 56 is in the form of an annulus positioned within the annularly arranged chamber 55 and divides the compartment 55 into a first chamber 57 and a second chamber 58, the carrier 56 having an annular coaxial extension 59 that cooperates with the wall 21 of the movable wall 15 to form a third chamber 61.

The carrier member 56 has an axial opening 62 therein which slidably receives a valve seat member 63 which is reciprocable in the opening 62. The valve seat member 63 is engaged by a plunger 64 operated by the foot pedal 65 through a suitable linkage.

A valve element 66 is floatingly carried by a diaphragm 67 that has its outer periphery secured between the extension 59 of the carrier 56 and the wall 21 to effect a seal between the second chamber 58 and the third chamber 61. The valve element 66 seats upon an annular seat 70 provided on the extension 59 of the carrier 56, as shown in FIGURE 2, and separates from the third chamber 61 a fourth chamber 71 that continuously communicates with the subatmospheric chamber, or vacuum chamber 16, by way of the passage 72 in the carrier 56 and the opening 73 in the wall 20 so that vacuum, or subatmospheric pressure, is constantly present in the chamber 70 when the valve element is in either position shown in FIGURE 1 or that shown in FIGURE 2.

A compression spring 74 is placed between the diaphragm 67 and the wall 21 to urge the valve element 66 upon the vacuum seat 70, as shown in FIGURE 2.

The valve seat member 63 has an annular seat 75 that is coaxial with the vacuum seat 70, the seat 75 performing the function of an air valve seat when it engages the valve element 66, as shown in FIGURE 1, chamber 61 being open to atmosphere through the filter element 76 and the opening 77 in the dirt boot 78.

The second chamber 58, which is a variable pressure chamber depending upon the position of the valve seat member 63 as to the FIGURE 1 or the FIGURE 2 position thereof, communicates with the third chamber 61 through a passage 77 when the valve seat member 63 is in the position shown in FIGURE 2 so that atmospheric air pressure is present in the second chamber 58 under control of the valve seat member 63.

The valve seat member 63 carries a seal 79 to prevent interflow of fluid between the first chamber 57 and the third chamber 61 or with the second chamber 58.

The compression spring 80 is provided between the valve seat member 63 and the reaction means 90, spring 80 normally urging the valve seat member 63 away from the reaction means 90 into engagement with the valve element 66 to disengage the valve element 66 from the vacuum seat 70, as shown in FIGURE 1, so that subatmospheric pressure or vacuum that is present in chamber 16 will also be present in the second chamber 58 which communicates with the chamber 17 by way of the passage 81.

The reaction means 90 consists of a flat disc 91 secured by a press fit on the end portion 52 of the plunger rod 50. A plurality of reaction levers 92 are pivotally mounted at their outer ends 93 on the carrier 56 so that the inner ends 94 are free to move from the position shown in FIGURE 1 to the position shown in FIGURE 2 when the disc 91 is moved in a right-hand direction resulting from the force effect of placing hydraulic fluid under pressure in the master cylinder 25.

In operation, when the plunger member 64 is moved in a left-hand direction, as viewed in the drawings, the valve seat member 63 is also moved in a left-hand direction from the position shown in FIGURE 1 to the position shown in FIGURE 2, the initial movement of the member 63 permitting the valve element 66 to engage the vacuum seat 70 while still being seated on the air seat 75 thereby closing the vacuum chamber 71 from communication with the chamber 58. Additional movement of the member 63 in a left-hand direction will then cause the air seat 75 to be removed from the valve element 66 so that atmospheric air pressure present in chamber 61 can pass through the passage 77 into chamber 58 and thence through passage 81 into chamber 17 to cause an increase of pressure in this chamber and move the wall 15 in a left-hand direction to effect fluid displacement from the master cylinder 25 and cause a brake application.

The extension portion 45 of the movable wall is provided with a series of spline grooves 100 which allow atmospheric air pressure from the chamber 101 to be present in the reaction means chamber 57.

While the embodiments of the present invention as herein disclosed constitute preferred forms, it is to be understood that other forms might be adopted.

What is claimed is as follows:

1. A brake booster mechanism comprising, a fluid pressure operated motor including a casing having a pressure differential responsive movable wall operable therein carrying a follow-up control valve mechanism controlling fluid pressure at opposite sides of the wall, said wall having an axially disposed compartment therein, a carrier member dividing said compartment into first and second chambers and including an axial extension cooperating with a wall of said compartment forming a third chamber, an annular valve element supported on a flexible diaphragm member and engageable with an annular valve seat on said extension to separate from said third chamber a fourth chamber, said carrier member having an axial opening therethrough, a valve seat member reciprocably slidable in said opening having one end in said third chamber and provided with an annular valve seat engageable with said valve element and the opposite end in said first chamber, a reaction transmission means in said first chamber, spring means between said reaction transmission means and said valve seat member urging the same out of engagement therewith and toward said valve element for engagement therewith, and additional spring means urging said valve element toward said annular valve seats for engagement therewith, passage means connecting said second and third chamber, and other passage means connecting said third chamber with atmosphere.

2. A brake booster mechanism constructed and arranged in accordance with the structure set forth in claim 1 wherein said valve seat member has an axial extension projecting through the said third chamber and axially through said valve element with said third chamber forming an annulus chamber around said extension of said valve seat member, said second chamber forming an annulus around said extension on said carrier member and with the said passage means connecting the second and third chambers being positioned radially through said extension of the carrier member.

References Cited in the file of this patent

UNITED STATES PATENTS

| | | |
|---|---|---|
| 2,861,427 | Whitten | Nov. 25, 1958 |
| 2,920,452 | Wasmer | Jan. 12, 1960 |
| 2,976,846 | Stelzer | Mar. 28, 1961 |